US007092669B2

(12) United States Patent  
Sakai et al.

(10) Patent No.: US 7,092,669 B2
(45) Date of Patent: Aug. 15, 2006

(54) SYSTEM FOR FACILITATING TEACHING AND LEARNING

(75) Inventors: Kiyoshi Sakai, Ohta-ku (JP); Yukiko Inada, Akishima (JP)

(73) Assignee: Ricoh Company, Ltd., Tokyo (JP)

( * ) Notice: Subject to any disclaimer, the term of this patent is extended or adjusted under 35 U.S.C. 154(b) by 201 days.

(21) Appl. No.: 10/058,276

(22) Filed: Jan. 30, 2002

(65) Prior Publication Data

US 2003/0207244 A1 Nov. 6, 2003

(30) Foreign Application Priority Data

Feb. 2, 2001 (JP) ............................. 2001-027465
Feb. 2, 2001 (JP) ............................. 2001-027466

(51) Int. Cl.
*G09B 7/00* (2006.01)

(52) U.S. Cl. ..................... 434/350; 434/362; 434/322; 434/323

(58) Field of Classification Search ............... 434/350, 434/362, 322, 323; 345/173, 730, 751, 753, 345/759; 715/730, 751, 753, 759
See application file for complete search history.

(56) References Cited

U.S. PATENT DOCUMENTS

| | | | | | |
|---|---|---|---|---|---|
| 3,924,339 | A | * | 12/1975 | Wilson et al. | ........... 434/308 X |
| 4,820,167 | A | * | 4/1989 | Nobles et al. | ........... 434/336 X |
| 4,855,725 | A | * | 8/1989 | Fernandez | ................... 345/173 |
| 4,937,821 | A | * | 6/1990 | Boulton | ...................... 370/482 |
| 4,963,097 | A | * | 10/1990 | Anju | ........................... 434/431 |
| 4,985,697 | A | * | 1/1991 | Boulton | ................... 715/500.1 |
| 5,002,491 | A | * | 3/1991 | Abrahamson et al. | .. 434/322 X |
| 5,176,520 | A | * | 1/1993 | Hamilton | .................... 434/350 |
| 5,742,815 | A | * | 4/1998 | Stern | ...................... 707/103 R |
| 5,823,788 | A | * | 10/1998 | Lemelson et al. | ........... 434/350 |
| 5,833,468 | A | * | 11/1998 | Guy et al. | ................... 434/350 |
| 6,064,856 | A | * | 5/2000 | Lee et al. | .................... 434/350 |
| 6,091,930 | A | * | 7/2000 | Mortimer et al. | ....... 434/362 X |
| 6,149,441 | A | * | 11/2000 | Pellegrino et al. | ...... 434/350 X |
| 6,155,840 | A | * | 12/2000 | Sallette | .................... 434/323 X |
| 6,261,103 | B1 | * | 7/2001 | Stephens et al. | ........ 434/276 X |
| 6,381,444 | B1 | * | 4/2002 | Aggarwal et al. | ...... 434/350 X |
| 6,397,036 | B1 | * | 5/2002 | Thean et al. | ............ 434/350 X |
| 6,411,796 | B1 | * | 6/2002 | Remschel | ............... 434/350 X |
| 6,470,171 | B1 | * | 10/2002 | Helmick et al. | ........ 434/362 X |
| 6,496,681 | B1 | * | 12/2002 | Linton | .................... 434/350 X |
| 6,549,751 | B1 | * | 4/2003 | Mandri | .................... 434/350 X |
| 6,615,020 | B1 | * | 9/2003 | Richter et al. | .......... 434/350 X |
| 6,633,223 | B1 | * | 10/2003 | Schenker et al. | .......... 340/5.53 |
| 6,688,891 | B1 | * | 2/2004 | Sanford | ...................... 434/365 |

(Continued)

FOREIGN PATENT DOCUMENTS

JP 402059784 A * 2/1990

(Continued)

*Primary Examiner*—Chanda L. Harris
(74) *Attorney, Agent, or Firm*—Morrison & Foerster LLP

(57) ABSTRACT

An input device of a multimedia board inputs lecturer-written information that a lecturer writes on a display page. An information processor sends the lecturer-written information input by the input device to a plurality of information terminals. A reader/writer of each of the plurality of information terminals reads out textbook information from a recording medium recording the textbook information representing contents of a textbook. A display device displays the read textbook information and the lecturer-written information supplied from the information processor, which are superimposed one on top of the other. The reader/writer records the textbook information and lecturer-written information, which are displayed by the display device, as a single file on the recording medium.

3 Claims, 13 Drawing Sheets

U.S. PATENT DOCUMENTS

| | | | |
|---|---|---|---|
| 2001/0036622 A1* | 11/2001 | Richter et al. | 434/350 |
| 2001/0053513 A1* | 12/2001 | Corn et al. | 434/350 |
| 2003/0110215 A1* | 6/2003 | Joao | 709/203 X |

FOREIGN PATENT DOCUMENTS

| | | |
|---|---|---|
| JP | 7-321978 | 12/1995 |
| JP | 2562107 | 9/1996 |

* cited by examiner

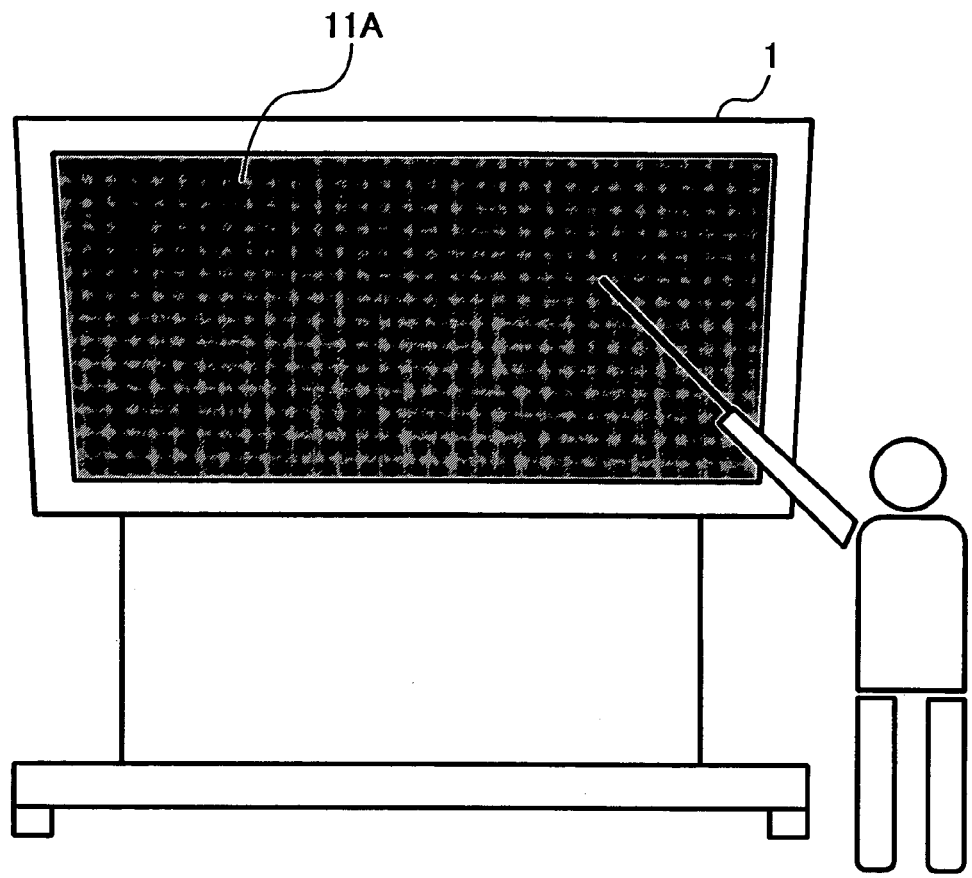
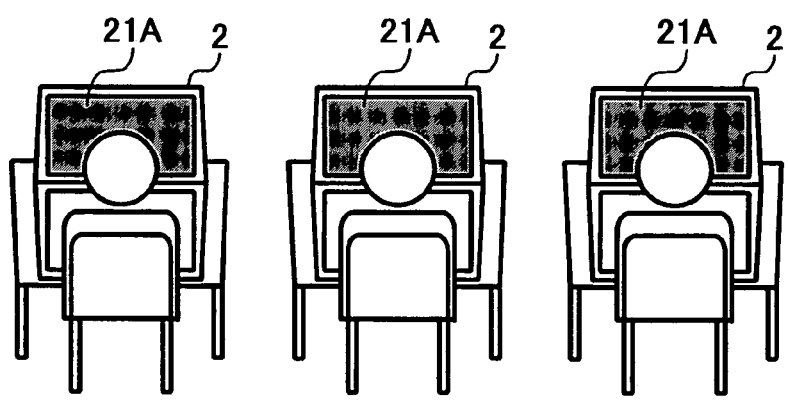
FIG. 2

ATTENDANCE MANAGEMENT INFORMATION

| CLASS | COURSE | TEACHER | NUMBER OF SCHEDULED LECTURES | NUMBER OF COMPLETED LECTURES |
|---|---|---|---|---|
| KW2002 | JAPANESE HISTORY | HIDEO SATO | 30 | 25 |

| STUDENT NUMBER | PERCENTAGE OF STUDENT'S ATTENDANCE | ATTENDANCE | | | |
|---|---|---|---|---|---|
| | | 4/10 | 4/17 | 4/24 | |
| H12001 | 92 | ●YES ○NO | ●YES ○NO | ●YES ○NO | ... |
| H12002 | 88 | ●YES ○NO | ●YES ○NO | ●YES ○NO | ... |
| H12003 | 66 | ○YES ●NO | ○YES ●NO | ○YES ●NO | ... |
| H12004 | 100 | ●YES ○NO | ●YES ○NO | ●YES ○NO | ... |
| H12005 | 92 | ●YES ○NO | ●YES ○NO | ●YES ○NO | ... |
| H12006 | 76 | ●YES ○NO | ○YES ●NO | ●YES ○NO | ... |
| ... | | | | | |

FIG. 11

COURSE-PASSING INFORMATION

| CLASS | COURSE | TEACHER | AVERAGE | LOWEST PASSING MARK |
|---|---|---|---|---|
| KW2002 | JAPANESE HISTORY | HIDEO SATO | 81.2 | 70 |

| STUDENT NUMBER | PERCENTAGE OF STUDENT'S ATTENDANCE | EXAM | PASS ? | COMMENT |
|---|---|---|---|---|
| H12001 | 92 | 92 | ⦿YES ◯NO | |
| H12002 | 88 | 86 | ⦿YES ◯NO | |
| H12003 | 66 | 68 | ◯YES ⦿NO | MAKEUP EXAM |
| H12004 | 100 | 90 | ⦿YES ◯NO | |
| H12005 | 92 | 100 | ⦿YES ◯NO | |
| H12006 | 76 | 84 | ⦿YES ◯NO | |
| ⋮ | ⋮ | ⋮ | ⋮ | ⋮ |

FIG. 14

SYSTEM FOR FACILITATING TEACHING AND LEARNING

CROSS-REFERENCE TO RELATED APPLICATIONS

The present invention is based upon Japanese Patent Application Nos. 2001-027465 and 2001-027466, both of which were filed on Feb. 2, 2001, the disclosures of which are incorporated herein by reference.

BACKGROUND OF THE INVENTION

1. Field of the Invention

The present invention relates to a teaching/learning-method facilitating system, a display terminal and a program, and, more particularly, to a teaching/learning-method facilitating system which reads out and displays educational information from a recording medium, records information to be additionally input in the educational information, and provides the contents of a lecture, thereby not bothering a speaker and listeners of the lecture to take notes in the lecture, so as to facilitate easy and comfortable educational situation both for the speaker and listeners.

2. Description of the Related Art

At educational places, such as schools, etc., students (listeners of a lecture) takes notes of what have been written on a whiteboard or the like during the lecture, so as to make their own note. In the case where there are a lot of information to be written, all what the students can do during the lecture is to write, and they have no time to think and ask the teacher some question. In such circumstances, the teacher and students lack communications with each other.

Japanese Patent Publication No. 2562107 discloses an image display prepared for establishing communications between the teacher and students.

The image display comprises a teacher-side device and at least one student-side device each of which includes an input unit, a monitor, etc.

The teacher-side device displays notes and images, etc. which are prepared by the teacher on the student-side device. The students can refer to the images displayed on the student-side device and participate in a class. The teacher-side device displays multiple-choice questions created by the teacher to test the students, on the monitor of the student-side device. The student presses a switch set on the student-side device to select an answer. The answer selected by the student is displayed on the monitor of the teacher-side device.

Since the student-side device has only one input unit that is the switch for selecting the answer, the student may not learn enough using the device. Besides, the notes and images prepared by the teacher are simply displayed, so that the student has to take notes of the notes and images displayed by the student-side device. In the case where there are a lot of information that should be written, the teacher and students lack communications with each other. In addition, the notes and images prepared by the teacher are simply displayed, the student can not use the prepared notes and images when reviewing the class.

Unexamined Japanese Patent Application KOKAI Publication No. H7-321978 discloses a system which displays the information contents written by the teacher on a board, etc. on a display of a terminal device used by at least one student, and records the displayed information on a recording medium.

In this case, what can be displayed on the display are only the information contents written by the teacher on the board. Hence, the student may not understand into which part of a textbook the written information corresponds.

What can be recorded on the recording medium are only the information contents written by the teacher on the board. Thus, when reviewing the class using the recorded data, it takes much time for the student to refer to the recorded data in association with the information of the textbook.

Again, what can be recorded on the recording medium are only the information contents written by the teacher on the board. Thus, the student needs to take notes of information contents that he/she thinks important. In this case, the student needs to review the class, while referring to the textbook, the data recorded on the recording medium and the notes in association with each other.

Further, what can be recorded on the recording medium are only the information contents written by the teacher on the board. In other words, the notes prepared by the teacher beforehand can not be displayed. Thus, the teacher writes a lot on the board, and the students write after the teacher finishes writing. That is, they waste much time during the class.

Accordingly, even if the techniques of Japanese Patent Publication No. 2562107 and Unexamined Japanese Patent Application KOKAI Publication No. H7-321978 are used, other than the work directly related to the education matters in the class, the work required of the teacher can not be reduced while giving a lecture in the class. On the other hand, the students have a lot to do (write) during the class, except learning.

The entire contents of Japanese Patent Publication No. 2562107 and Unexamined Japanese Patent Application KOKAI Publication No. H7-321978 are herein incorporated by reference in their entirety.

SUMMARY OF THE INVENTION

The present invention has been made in consideration of the above. It is accordingly an object of the present invention to provide a teaching/learning-method facilitating system, a display terminal and a program for reducing the work of teaching staffs at educational places.

Another object thereof is to provide a teaching/leaning-method facilitating system, a display terminal and a program for reducing the tasks of those who learn at educational places.

Still another object thereof is to provide a teaching/learning-method facilitating system, a display terminal and a program for enhancing the learning efficiency of learners.

In order to attain the above objects, according to the first aspect of the present invention, there is provided a teaching/learning-method facilitating system comprising:

a lecturer terminal which is used by a lecturer in a lecture; and a plurality of listener terminals which are used respectively by a plurality of listeners in the lecture, and wherein the lecturer terminal comprises a first input unit which includes an input panel and inputs lecturer-written information written by lecturer on the input panel, and a written-information sender which sends the lecturer-written information input by the first input unit to the plurality of listener terminals, and each of the plurality of listener terminals comprises
a second reader which reads out textbook information representing contents of a textbook from a listener recording medium recording the textbook information,
a second display unit which has a listener page, and displays the textbook information and the lecturer-written information supplied from the written-information sender on the listener page, and
a second writer which records the lecturer-written information displayed by the second display unit on the listener recording medium.

According to this invention, the works of the lecturer and listeners can be reduced, and thus enhancing the learning efficiency.

The lecturer terminal may further include
a first reader which reads out the textbook information from a lecturer recording medium recording the textbook information,
a first display unit which has a lecturer page, and displays the textbook information on the lecturer page, and
an index sender which sends index information for specifying a range in which the textbook information is to be displayed to the plurality of listener terminals; and
the second reader may read out the textbook information in the range specified in the index information from the listener recording medium.

The input panel may be arranged on the lecturer page;
the first display unit may display the lecturer-written information in a position where the lecturer has written the lecturer-written information;
the written-information sender may send position information representing a position wherein the lecturer-written information is displayed to the plurality of listener terminals, together with the lecturer-written information; and
the second display unit may display the lecturer-written information in the position specified in the position information.

Each of the lecturer recording medium and the listener recording medium may record lecture information representing lecture contents regarding the contents of the textbook;
the first reader may read out the lecture information together with the textbook information;
the first display unit may divide the lecturer page into a plurality of areas, and displays the textbook information and lecture information respectively in the plurality of areas;
the second reader may read out the lecture information together with the textbook information; and
the second display unit may divide the listener page into a plurality of areas, and displays the textbook information and the lecture information respectively in the plurality of areas.

The lecturer terminal may further include a first writer which records the lecturer-written information displayed by the first display unit on the lecturer recording medium.

Each of the plurality of listener terminals may further include a second input unit which inputs listener-written information written by each of the plurality of listeners on the listener page; and
the second display unit may display the listener-written information in a position where each of the plurality of listeners has written the listener-written information.

The second writer may record a plurality of information pieces displayed by the second display unit on the listener recording medium, as a single file.

The teaching/learning-method facilitating system may further comprise an attendance-management terminal which manages attendance of each of the plurality of listeners, and
wherein each of the plurality of listener terminals further includes an attendance-information sender which sends attendance information representing that each of the plurality of listeners has attended the lecture to the attendance-management terminal, in response to a predetermined operation of each of the plurality of listeners, and
the attendance-management terminal obtains percentage of each of the plurality of listeners' attendance, using the attendance information supplied from each of the plurality of listener terminals.

Each of the plurality of listener terminals may further include a detector which detects that each of the plurality of listeners has touched the listener page; and
the attendance-information sender may send the attendance information to the attendance-management terminal, upon detection of that each of the listeners has touched the listener page.

The teaching/learning-method facilitating system may further include a credit-management terminal which determines whether each of the plurality of listeners has passed a course, and
wherein the credit-management terminal comprises
a database which stores an exam result of each of the plurality of listeners,
an acquirer which acquires the percentage of each of the listeners' attendance from the attendance-management terminal, and
a credit determiner which determines whether each of the listeners has passed a course, based on the exam result and the percentage of each listener's attendance.

The listener recording medium may records exam questions;
the second reader may read out the exam questions from the listener recording medium; and
the second display unit may display the exam questions on the listener page.

The teaching/learning-method facilitating system may further include a marking terminal which marks answers of each of the listeners to the exam questions, and
wherein each of the plurality of listener terminals further includes
an answer acquirer which acquires answers that each of the listeners writes on the listener page, and
an answer sender which sends the answers acquired by the answer acquirer to the marking terminal, and the marking terminal comprises
a memory which stores correct answers of the exam questions, and
a marker which marks the answers of each of the listeners which are supplied from each of the plurality of listener terminals, using the correct answers stored in the memory.

The marking terminal may further include a result sender which sends a marked result of the marker to the credit-management terminal, as the exam result of each of the listeners.

In order to attain the objects, according to the second aspect of the present invention, there is provided a display terminal comprising:
a reader which reads out fixed information from a recording medium recording the fixed information;
an input unit which inputs an drawn image drawn by an operator on a predetermined display page;

a display unit which displays the fixed information read out by the reader and the drawn image input by the input unit on the page, which are superimposed one on top of other; and a sender which sends index information specifying a range in which the fixed information is displayed and data of the drawn image, to another display terminal, thereby displaying same information contents on the another display terminal as information contents displayed by the display unit.

In order to attain the above objects, according to the third aspect of the present invention, there is provided a display terminal comprising:

a reader which reads out fixed information in a same range as a range of fixed information displayed by another display terminal, from a recording medium recording same fixed information as fixed information displayed by the another display terminal;

a receiver which receives drawn image drawn by an operator of the another display terminal and supplied from the another display terminal; and a display unit which displays the fixed information read out by the reader and the drawn image received by the receiver, which are superimposed one on top of other.

In order to attain the above objects, according to the fourth aspect of the present invention, there is provided a program for controlling a computer to serve as a display terminal comprising:

a reader which reads out fixed information from a recording medium recording the fixed information;

an input unit which inputs a drawn image drawn by an operator on a predetermined display page;

a display unit which displays the fixed information read out by the reader and the drawn image input by the input unit, which are superimposed one on top of other on the page; and a sender which sends index information specifying a range in which the fixed information is displayed and data of the drawn image to another display terminal, thereby displaying same information contents on the another display terminal as information contents displayed by the display unit.

In order to attain the above objects, according to the fifth aspect of the present invention, there is provided a program for controlling a computer to serve as a display terminal comprising:

a reader which reads out fixed information in a same range as a range of fixed information displayed by another display terminal, from a recording medium recording same fixed information as fixed information displayed by the another display terminal;

a receiver which receives a drawn image drawn by an operator of the another display terminal and supplied from the another display terminal; and a display unit which displays the fixed information read out by the reader and the drawn image received by the receiver, which are superimposed one on top of another.

BRIEF DESCRIPTION OF THE DRAWINGS

These objects and other objects and advantages of the present invention will become more apparent upon reading of the following detailed description and the accompanying drawings in which:

FIG. 2 is a diagram exemplarily showing the structure of the teaching/learning-method facilitating system installed in a classroom;

FIG. 11 is a diagram showing a specific example of the structure of a database included in the attendance management system;

FIG. 14 is a diagram showing a specific example of the structure of a database included in the grade management system.

DETAILED DESCRIPTION OF THE PREFERRED EMBODIMENTS

First Embodiment

A teaching/learning-method facilitating system according to the first embodiment of the present invention will now be explained with reference to the accompany drawings.

Figure 1:
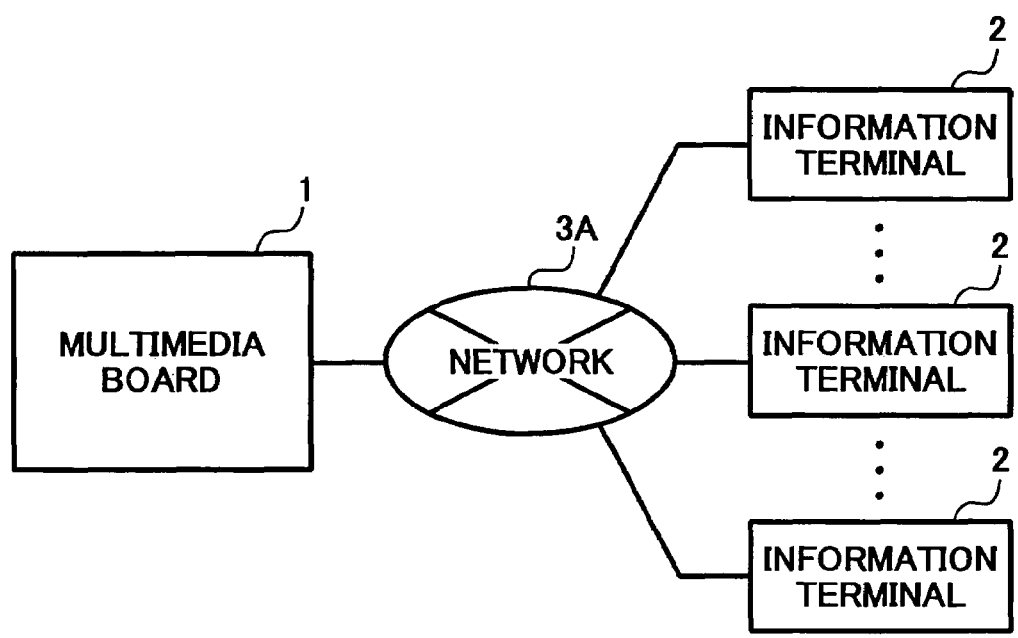
FIG. 1 is a diagram showing the structure of a teaching/learning-method facilitating system according to the first embodiment of the present invention.

The teaching/learning-method facilitating system according to the first embodiment comprises, as shown in FIG. 1, a multimedia board 1, a plurality of information terminals 2 and a network 3A. The multimedia board 1 and the plurality of information terminals 2 are connected with each other through the network 3A.

In the case where the teaching/learning-method facilitating system is installed in a classroom, for example, the multimedia board 1 is used by the teacher (a speaker in the classroom), and the plurality of information terminals 2 are used respectively by the students (listeners in the classroom), as shown in FIG. 2. The network 3A includes an in-class LAN (Local Area Network), etc.

Figure 3:
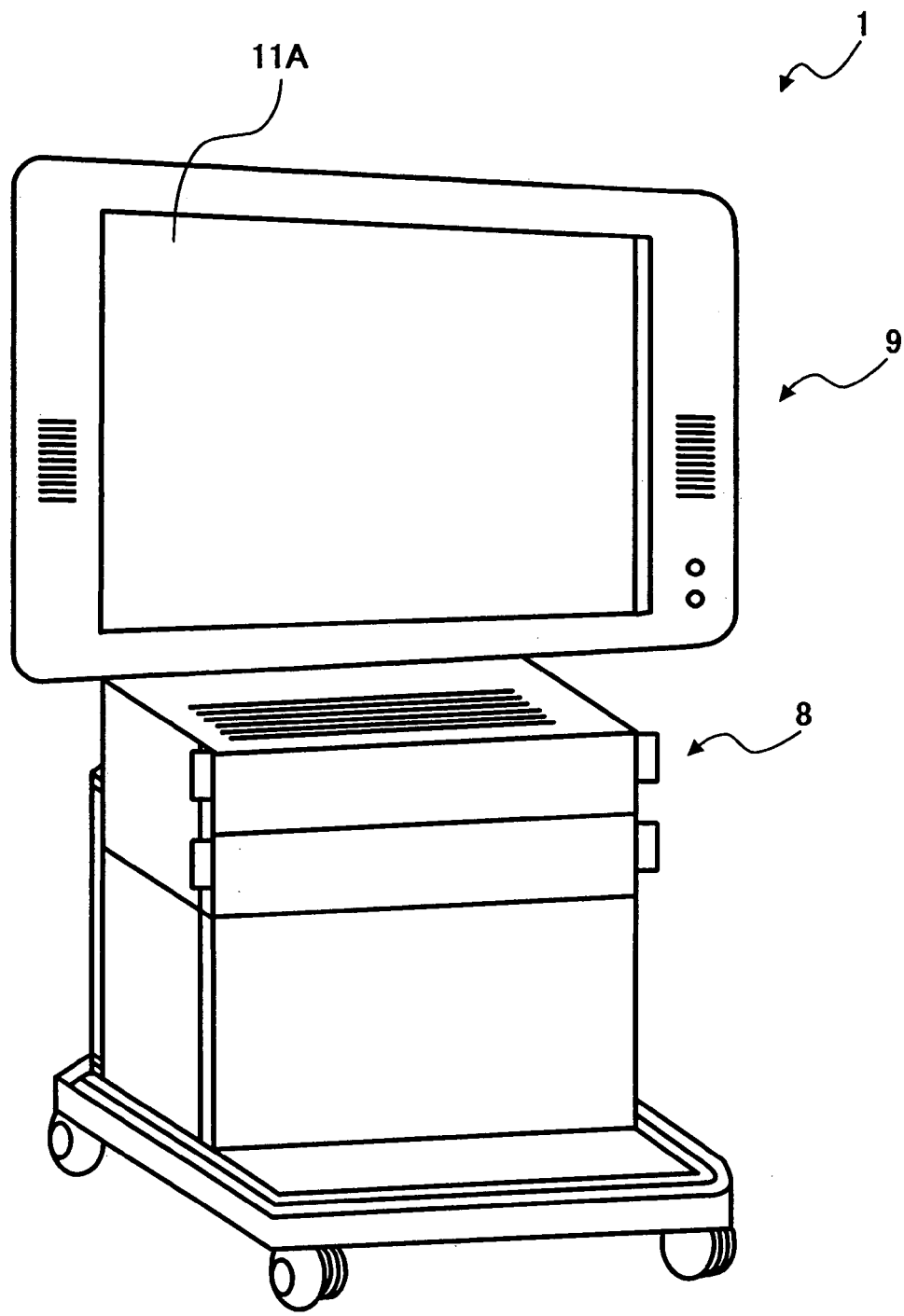
FIG. 3 is a perspective diagram exemplarily showing the outward appearance of a multimedia board included in the teaching/learning-method facilitating system.

The multimedia board 1 comprises, as shown in FIG. 3, a container 8 containing various information devices for controlling the multimedia board 1 and a board section 9 displaying various images, pictures, etc.

Figure 4:
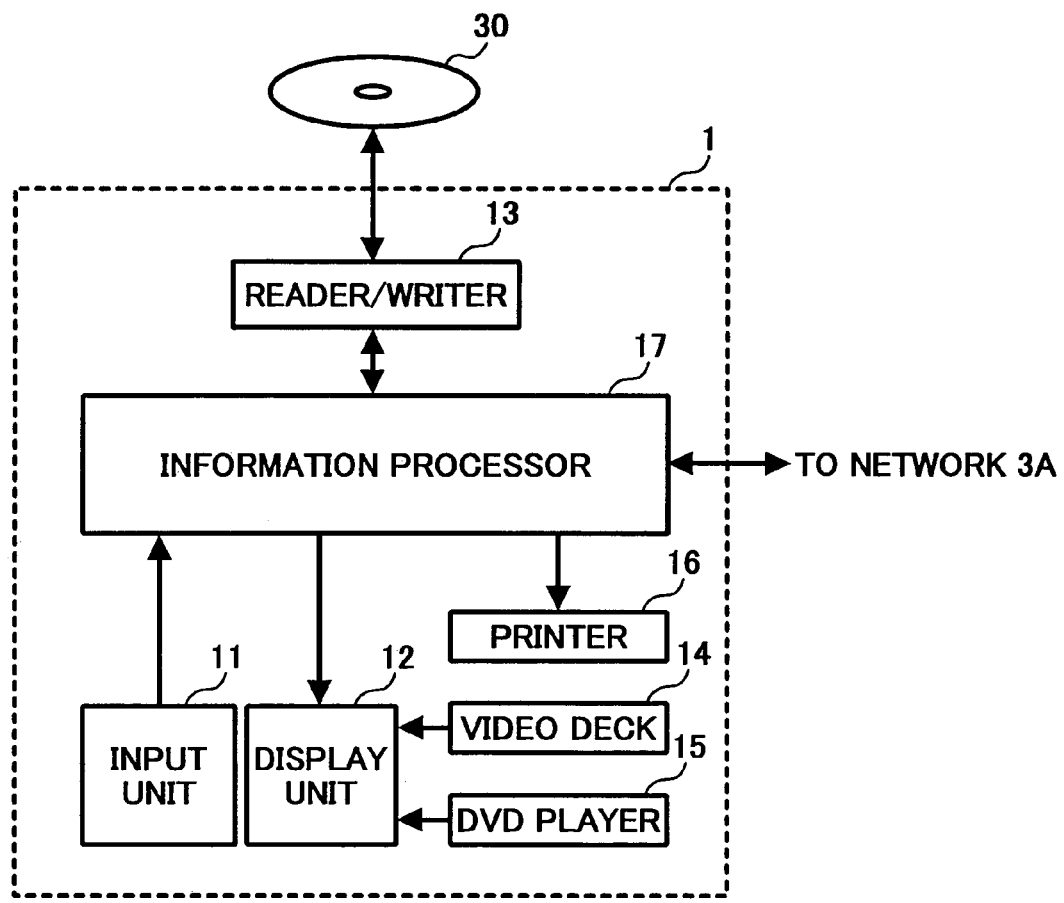
FIG. 4 is a block diagram showing the structure of the multimedia board.

FIG. 4 is a diagram specifically showing the structure of the multimedia board 1.

As shown in FIG. 4, the multimedia board 1 comprises an input unit 11, a display unit 12, a reader/writer 13, a video deck 14, a DVD player 15, a printer 16 and an information processor 17.

The input unit 11 includes a touch panel 11A installed on a display of the board section 9. The touch panel 11A is formed from a transparent tablet which may, for example, include an ultrasonic-surface elastic wave touch-panel system. The input unit 11 imports the letters, drawings, etc. written and drawn on the display page by an operator (the teacher) through the touch panel 11A, and inputs the imported letters, drawings, etc. into the information processor 17.

Specifically, the input unit 11 detects those positions, on the touch panel 11A, which are touched by the operator using his/her fingers or an input pen, etc., and obtains coordinates of the detected positions. The input unit 11 outputs coordinate information representing the obtained coordinates to the information processor 17.

On the touch panel 11A, there is prepared a "set" button (not illustrated) for setting colors and size of lines. The operator touches the "set" button to select the colors and size of lines. Upon selection of the "set" button, the input unit 11 outputs setting information representing the selected color and size of a line to the information processor 17.

The display unit 12 includes a display, which is installed in the board section 9 and has relatively a large-sized display screen with high intensity. The display may be a plasma display panel having an opposite angle of 50 inches or more.

The display unit 12 displays information read out from a recording medium 30 and the letters and figures, etc. written and drawn by the operator on the touch panel 11A. The display unit 12 displays also the images reproduced by the video deck 14 and DVD deck 15.

The display unit 12 changes the images and video to be displayed one from another, under the control of the information processor 17. Specifically, display unit 12 displays either the information (images including letters, drawings, paintings, etc.) read out from the recording medium 30, pictures reproduced by the video deck 14 or pictures reproduced by the DVD player 15, in response to a change-signal for changing data to be displayed from the information processor 17.

The reader/writer 13 includes a CD player or a DVD player, etc., and contains the recording medium 30, such as a CD, DVD or the like. The reader/writer 13 reads out information recorded on the recording medium 30, under the control of the information processor 17, and outputs the read information to the information processor 17. The reader/writer 13 writes data to be provided from the information processor 17 onto the recording medium 30, under the control of the information processor 17.

The video deck 14 is connected to a video-input terminal, etc. that the display unit 12 has. The video deck 14 contains a source medium (e.g. a vide tape). In response to operations of the operator, the video deck 14 reproduces pictures recorded on the source medium, and outputs the reproduced pictures on the display unit 12.

The DVD player 15 is connected to the video-input terminal, etc. that the display unit 12 has. The DVD player 15 contains a source medium (e.g. a DVD (Digital Versatile Disc)). The DVD player 15 reproduces pictures recorded on the source medium, in response to operations of the operator, and outputs the reproduced pictures on the display unit 12.

The printer 16 prints data to be provided from the information processor 17 on recording papers, etc., under the control of the information processor 17.

In response to an operation of the operator, the information processor 17 operates in accordance with a pre-given program, as follows:

The information processor 17 controls the reader/writer 13 to retrieve information recorded on the recording medium 30. The information processor 17 outputs the retrieved information on the display unit 12.

The information processor 17 generates display data for displaying the letter and figures written and drawn by the operator on the touch panel 11A, using the coordinate information supplied from the input unit 11, and outputs the generated display data onto the display unit 12. At this time, the information processor 17 sets the colors and size of lines, in accordance with the setting information supplied from the input unit 11.

The information processor 17 outputs the change-signal to the display unit 12. The information processor 17 outputs data displayed on the display unit 12 to the printer 16.

The information processor 17 communicates with the information terminals 2 through the network 3A. For example, the information processor 17 sends index information for specifying the information displayed on the display unit 12, of the information recorded on the recording medium 30, to the information terminals 2. In addition, the information processor 17 outputs information representing the letters and figures written and drawn by the operator on the touch panel 11A, to the information terminals 2. The information processor 17 stores information to be supplied from the information terminals 2.

The structure of the information processor 17 will specifically be described.

Figure 5:
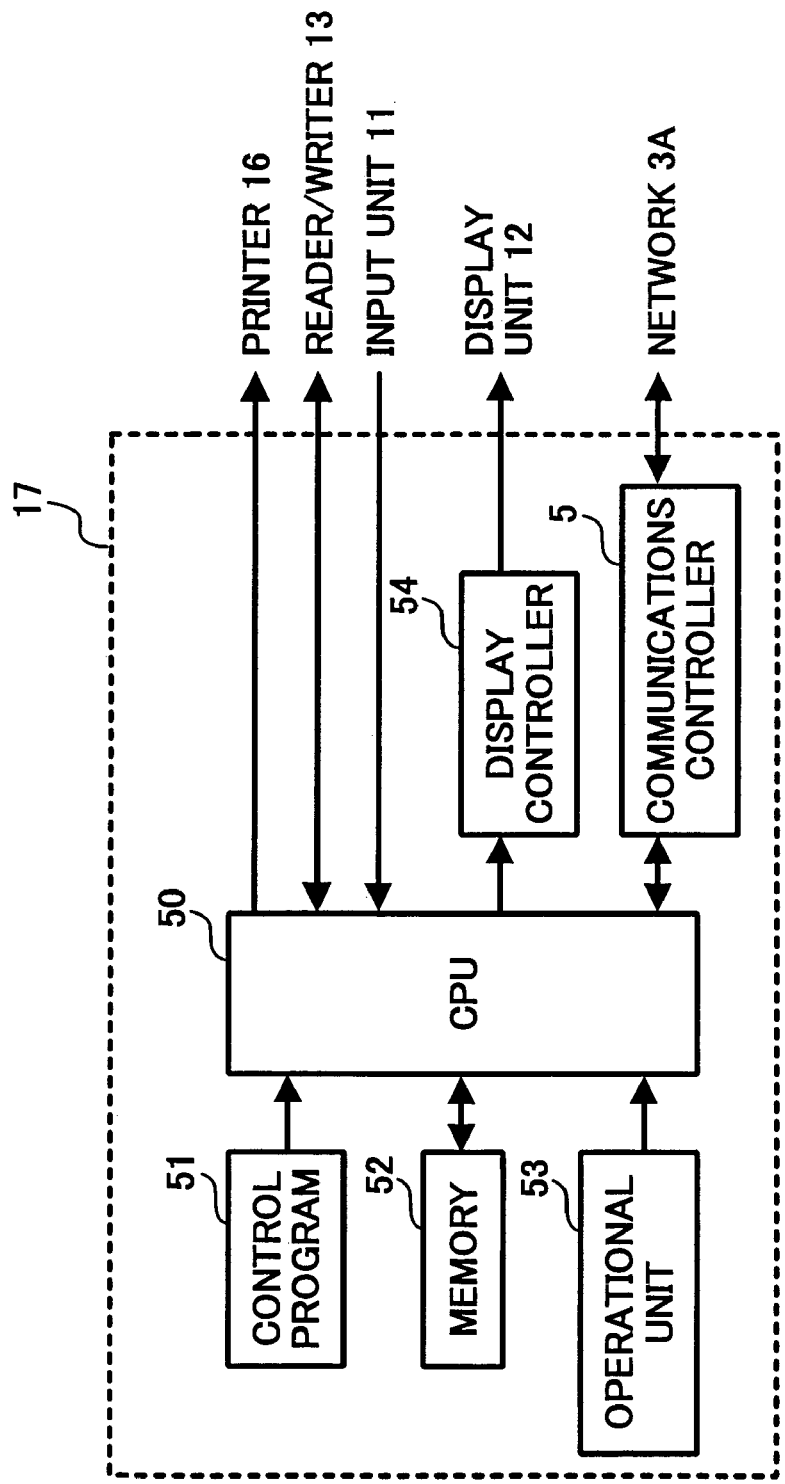
FIG. 5 is a block diagram showing an information processor.

The information processor 17 comprises, as shown in FIG. 5, a CPU (Central Processing Unit) 50, a control program 51, a memory 52, an operational unit 53, a display controller 54 and a communications controller 55.

The control program 51 is made up of various programs for controlling operations of the CPU 50.

In response to operations of the operator, the CPU 50 performs various operations in accordance with the control program 51, as follows:

The CPU 50 outputs the above-described change-signal, to the display unit 12 through the display controller 54.

The CPU 50 controls the reader/writer 13 to acquire information recorded on the recording medium 30. The CPU 50 outputs the acquired information to the display controller 54. At this time, the CPU 50 sends the above-described index information for specifying the information to be displayed by the display unit 12, to the information terminals 2 through the communications controller 55.

Based on the coordinate information supplied from the input unit 11, the CPU 50 identifies the letter and figures written and drawn by the operator. The CPU 50 outputs the image information representing the identified letters and figures to the display controller 54.

The CPU 50 divides the image to be displayed by the display unit 12 into various layers of a "background" layer, a "handwritten" layer, an "additional" layer, etc., and manages the divided layers of image. The CPU 50 manages the background image represented with bit-map data, in the "background" layer, and manages the handwritten letters and figures represented with vector data, in the "handwritten" layer. In other words, the CPU 50 manages the data from the input unit 11, in the "handwritten" layer, and manages the data from the reader/writer 13, in the "background" layer.

The CPU 50 manages the information representing the letters and figures written and drawn by the operator and their display positions (the coordinates), as additional information in the "additional" layer. The CPU 50 outputs the additional information to the information terminals 2 through the communications controller 55.

The CPU 50 controls the reader/writer 13, records the information contents displayed by the display unit 12, on the recording medium 30. At this time, the CPU 50 creates one file, while maintaining data managed in the "background" and "handwritten" layers. Further, the CPU 50 controls the reader/writer 13 to record the created file on the recording medium 30. Having perform the above, the CPU 50 can restore the information contents displayed by the display unit 12, using the recorded file.

The CPU 50 outputs data representing the information contents displayed by the display unit 12 to the printer 16.

The memory 52 stores the above-described setting information and information supplied from the information terminals 2, etc.

The operational unit 53 includes a plurality of operational buttons, and operated by the operator. In response to an operation of the operator, the operational unit 53 inputs signals for instructing the CPU 50 to change the displayed page, to send/receive data and to begin printing information, to the CPU 50.

In response to image information supplied from the CPU 50, the display controller 54 generates display data for displaying one or more images represented by the image information, and outputs the generated display data to the display unit 12.

The communications controller 55 sends the data supplied from the CPU 50 to the information terminals 2 through the network 3A. The communications controller 55 receives data from the information terminals 2, and supplies the received data to the CPU 50. When sending data, the communications controller 55 sends ID (identification) information of the multimedia board 1, together with the data to be sent.

The structure of each of the information terminals 2 will now specifically be described.

Figure 6:
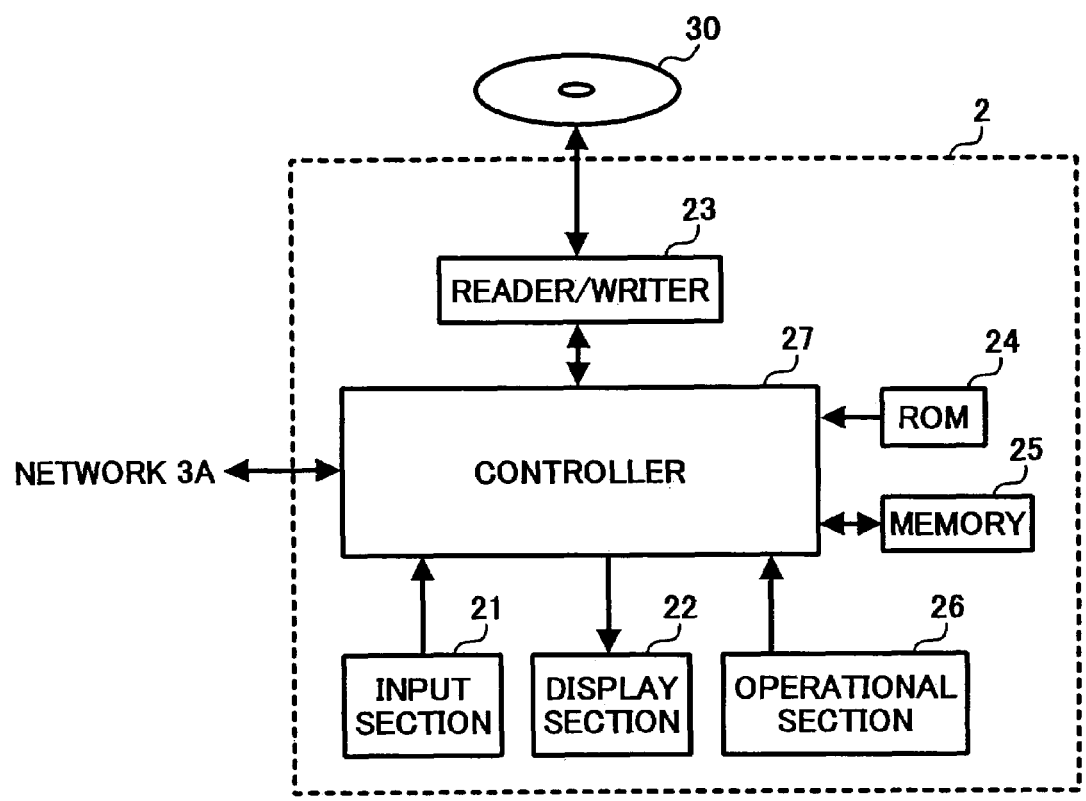
FIG. 6 is a block diagram showing the structure of an information terminal.

Each of the information terminals 2 functionally comprises, as shown in FIG. 6, an input section 21, a display section 22, a reader/writer 23, a ROM 24, a memory 25, an operational section 26 and a controller 27.

The input section 21 includes a touch panel 21A. The input section 21 retrieves the letters and figures written and drawn by an operator (the student) using an input pen, through the touch panel 21A, and inputs the retrieved information to the controller 27. Specifically, the input section 21 detects the positions that the operator has touched on the touch panel 21A. The input section 21 outputs position information representing the detected positions to the controller 27.

On the touch panel 21A, there is set a "set" button (not illustrated) for setting the colors and size of lines to be drawn. The operator touches the "set" button to select the color and size of each line to be drawn. Upon selection of the color and size of each line, the input section 21 outputs setting information representing the selected color and size of each line to the controller 27.

The display section 22 is a liquid crystal display, for example, and displays images in accordance with the display data supplied from the controller 27. The touch panel 21A included in the input section 21 is installed onto the display page of the display section 22.

The reader/writer 23 includes a CD player or DVD player, etc., and contains a recording medium 30, such as a CD, DVD, etc. The reader/writer 23 reads out information recorded on the recording medium 30, under the control of the controller 27. The reader/writer 23 outputs information read out from the recording medium 30 to the controller 27.

The reader/writer 23 writes data supplied from the controller 27 onto the recording medium 30, under the control of the controller 27.

The ROM 24 stores a program for controlling operations of the controller 27.

The memory 25 functions as a work memory of the controller 27, and stores data supplied from the multimedia board 1 and any other information terminal 2.

The operational section 26 includes a plurality of operational buttons, and is operated by the operator. In response to operation of the operator, the operational section 26 inputs signals for instructing the controller 27 to change the display page and to send/receive data, to the controller 27.

The controller 27 includes a CPU, etc. for executing the program stored in the ROM 24.

The controller 27 controls the reader/writer 23, reads out information specified by the index information sent from the multimedia board 1, from the recording medium 30. The controller 27 controls the display section 22 to display the information read out from the recording medium 30.

The controller 27 obtains coordinates of positions that the operator touched on the touch panel 21A, based on the position information supplied from the input section 21. The controller 27 generates display data for displaying the letter and figures written and drawn by the operator on the touch panel 21A, from the obtained coordinates, and outputs the generated data to the display section 22. At this time, the controller 27 sets the color and size of each line, in accordance with setting information supplied from the input section 21.

The controller 27 generates display data for displaying the letters and figures drawn by the operator of the multimedia board 1, based on the additional information supplied from the multimedia board 1 through the network 3A, and outputs the generated display data to the display section 22.

The controller 27 sends and receives data to and from the multimedia board 1 and any other information terminal 2, through the network 3A. When sending data, the controller 27 sends identification information (device ID) of the information terminal 2, together with the data to be sent.

Likewise the CPU 50 of the multimedia board 1, the controller 27 divides the images to be displayed by the display section 22 into a plurality of layers, and manages the image. Specifically, the controller 27 manages the data supplied from the input section 21, in a "handwritten" layer, and manages the data from the reader/writer 23, in a "background" layer. Further, the controller 27 manages additional information from the multimedia board 1, in a "reception" layer.

The controller 27 controls the reader/writer 23 to record the information contents displayed by the display section 22 on the recording medium 30. At this time, the controller 27 creates a single file, while maintaining the data managed in the plurality of layers. The controller 27 controls the reader/writer 23 to record the created file on the recording medium 30. Now, the controller 27 can restore the information contents displayed by the display section 22, using the recorded file.

The structure of the recording medium 30 will now be described.

Figure 7:
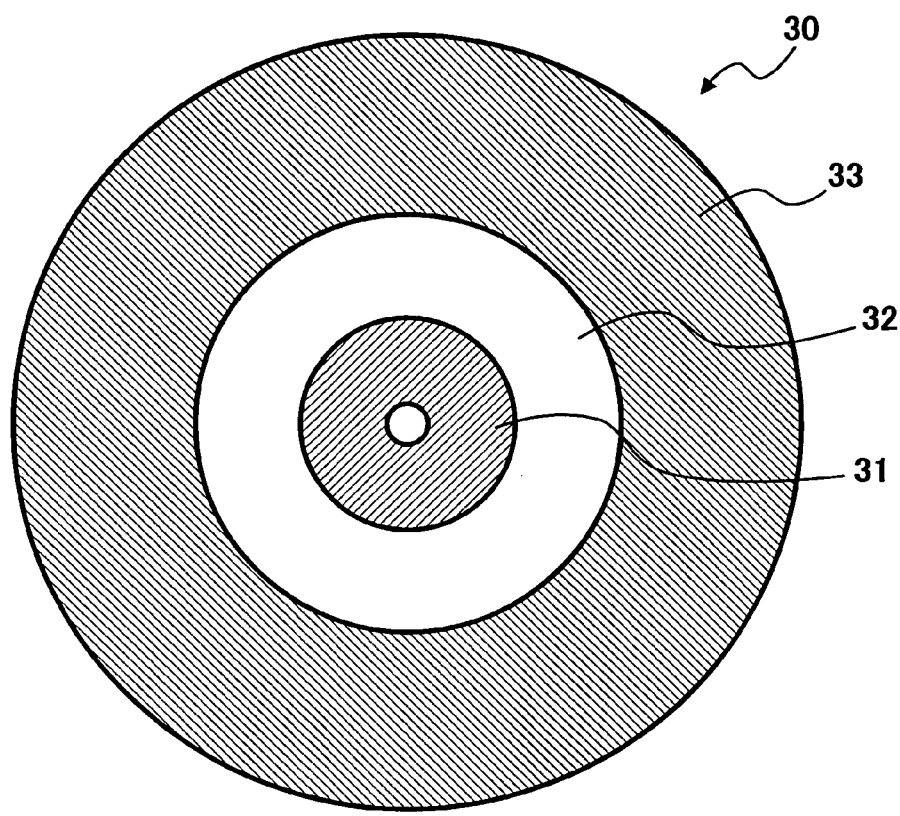
FIG. 7 is a diagram showing the structure of an information recording medium.

The recording medium 30 has the first recording area 31, the second recording area 32 and the third recording area 33, as shown in FIG. 7.

The first recording area 31 is a ROM (Read Only Memory) area wherein information (hereinafter referred to as textbook information) written in textbooks are recorded.

The second recording area 32 is a ROM area wherein the lecture contents (hereinafter referred to as lecture information) regarding the textbook information recorded in the first recording area 31.

The third recording area 33 is a RAM (Random Access Memory) area into and from which arbitrary information can be written and read.

Operations of the teaching/learning-method facilitating system according to the first embodiment will now be explained.

(0) Condition

Both the teacher leading a class (a lecture) and the plurality of students (listeners) prepare the same recording medium 30 recording the textbook information and lecture information to be used in the class.

(1) Operation for Reading Information from Recording Medium 30

Before the class, the teacher sets the recording medium 30 in the reader/writer 30 of the multimedia board 1, and each student sets the recording medium 30 in the reader/writer 23 of each information terminal 2.

Upon operation of the information processor 17, the information processor 17 of the multimedia board 1 controls the reader/writer 13 to read out textbook information and lecture information specified by the teacher from the recording medium 30. The information processor 17 outputs the read textbook information and lecture information onto the display unit 12. Then, the display unit 12 displays textbook information and lecture information supplied from the information processor 17.

Figure 8:
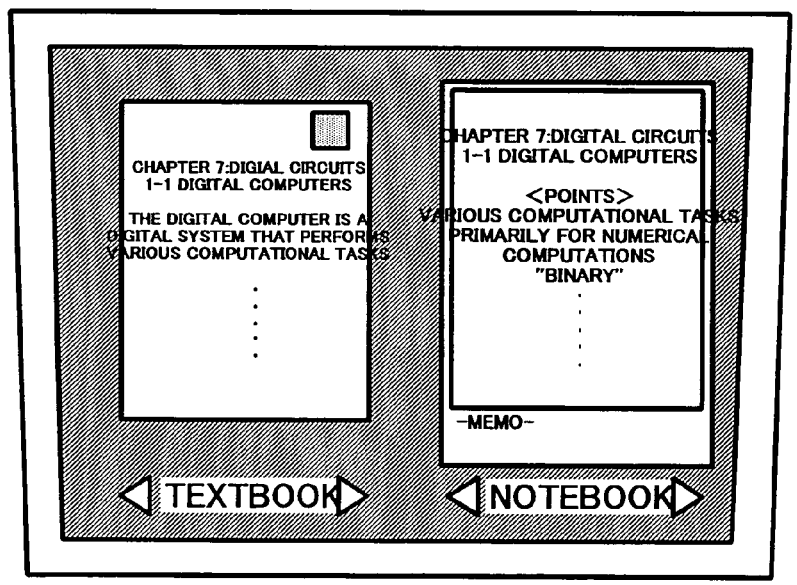
FIG. 8 is a diagram showing an example of a display page shown on the multimedia board.

For example, the display unit 12 displays the textbook information and lecture information respectively in a left window and a right window, as shown in FIG. 8.

When reading the textbook information and lecture information, the information processor 17 generates index information representing a page of the textbook information and lecture information to be displayed, for example, and sends the generated index information to each information terminal 2 through the network 3A.

Each information terminal 2 used by each student receives the index information from the multimedia board 1 through the network 3A.

The controller 27 of each information terminal 2 controls the reader/writer 23, upon reception of the index information, to read the textbook information and lecture information specified in the index information from the recording medium 30. The controller 27 outputs the read textbook information and lecture information on the display section 22.

The display section 22 displays the textbook information and lecture information supplied from the controller 27, respectively in the left and right windows, as shown in FIG. 8. Accordingly, the display section 22 displays the same information as that displayed by the display unit 12 of the multimedia board 1.

(2) Operation of Information Terminal 2 to Record Information on Recording Medium 30

The teacher gives a lecture using the textbook information and lecture information displayed by the display unit 12 of the multimedia board 1.

On the other hand, the students listen to the teacher while referring to the information displayed by the display section 22 of the information terminal 2 and/or the display device 12 of the multimedia board 1.

If necessary, the students underline some important part of the displayed lecture contents using a pen, and writes down non-displayed important information in a memo area prepared in the lower section of the lecture information using the pen.

The input section 21 of each information terminal 2 retrieves the written memo and underlines, and inputs information of the retrieved memo and underlines to the controller 27. Specifically, the input section 21 detects positions that the student has touched on the touch panel 21A using the pen. The input section 21 outputs position information representing the detected positions to the controller 27.

The controller 27 obtains coordinates of the positions that the student has touched on the touch panel 21A, based on the position information supplied from the input section 21. The controller 27 generates display data for displaying the memo and the underlines input by the student, based on the obtained coordinates, and outputs the generated display data to the display section 22.

The display section 22 displays the memo and underlines, in accordance with the display data supplied from the controller 27. Note that the color, size, mark, etc. of the memo and underlines are set in advance.

As explained above, of the information contents displayed on the display page, the controller 27 manages the textbook information and lecture information read out by the reader/writer 23 in the "background" layer. Further, the controller 27 manages information representing the memo and underlines sent from the input section 21, in the "handwritten" layer.

The controller 27 controls the reader/writer 23 to generate a single file, while maintaining the information contents of each layer, and records the generated file in the third recording area 33 of the recording medium 30.

As explained above, the information contents (including the memo and underlines written by the student) displayed by the display section 22 of the information terminal 2 are recorded on the recording medium 30.

(3) Operation of Multimedia Board 1 to Record Information on Recording Medium 30

The teacher gives a lecture using the textbook information and lecture information displayed by the display unit 12 of the multimedia board 1. If necessary, the teacher underlines some important information and writes additional information, using the pen.

The input unit 11 of the multimedia board 1 retrieves the written additional memo and underlines, and inputs information representing the retrieved memo and underlines to the information processor 17. Specifically, the input unit 11 detects the positions that the teacher has touched on the touch panel 11A using the pen, and obtains coordinates of the detected positions. The input unit 11 outputs coordinate information representing the obtained coordinates to the information processor 17.

The CPU 50 of the information processor 17 identifies the teacher-input memo and underlines, based on the coordinate information supplied from the input unit 11. After this, the CPU 50 outputs the image information representing the identified memo and underlines to the display controller 54.

In response to the image information supplied from the CPU 50, the display controller 54 generates display data for displaying images represented by the image information, and outputs the generated display data to the display unit 12.

The display unit 12 displays the teacher-input memo and underlines, in accordance with the display data supplied from the display controller 54. Note that the color, size, mark, etc. of the memo and underlines are set in advance.

As described above, of the information contents displayed on the display page, the CPU 50 manages the textbook information and lecture information read out by the reader/writer 23, in the "background" layer, and manages the information of the memo and underlines supplied from the input unit 11, in the "handwritten" layer.

The CPU 50 generates a single file, while maintaining the information contents of each layer, and controls the reader/writer 30 to record the generated file in the third recording area 33 of the recording medium 30.

As explained above, the information contents (including the teacher-written memo and underlines) displayed by the display unit 12 of the multimedia board 1 are recorded on the recording medium 30.

(4) Operation for Sharing Information Contents Added by Teacher Between Multimedia Board 1 and Information Terminals 2

In addition to the operations of (1) to (3), the multimedia board 1 carries out the following operations.

As explained above, the same textbook information and lecture information are displayed on the multimedia board 1 and each information terminal 2.

As described above, the teacher writes the memo and underlines about some information on the touch panel 11A so as to add some necessary information.

The input unit 11 of the multimedia board 1 obtains coordinates of positions that the teacher has touched on the touch panel 11Ausing the pen, and outputs coordinate information representing the obtained coordinates to the information processor 17.

The CPU 50 of the information processor 17 identifies the teacher-input memo and underlines, based on the coordinate information supplied from the input unit 11. The CPU 50 manages the information representing the identified memo, underlines and their display positions (coordinates), as additional information in the "additional" layer.

The CPU 50 outputs the additional information managed in the "additional" layer to each information terminal 2 through the communications controller 55.

The controller 27 of each information terminal 2 receives the additional information supplied from the multimedia board 1, and manages the received additional information in the "reception" layer. The controller 27 outputs the additional information to the display section 22.

The display section 22 displays the additional information managed in the "reception" layer, together with the information managed in the "background" and "handwritten" layers.

According to this structure, each student can see the additional information, such as the memo and underlines, etc. written by the teacher on the display page of the multimedia board 1, on his/her own information terminal 2.

Likewise the above, the controller 27 generates a single file, while maintaining the information contents of the "background" layer, "handwritten" layer and "reception" layer, and controls the reader/writer 23 to record the generated file in the third recording area 33 of the recording medium 30.

As explained above, the textbook information and lecture information are recorded on the recording medium 30, and those information to be added to the above information by the teacher are provided to each information terminal 2 used by each student. Hence, the student can not omit those necessary information from the lecture information and additional information. Besides, it is not necessary that the student take notes of the lecture.

Each student writes down only a small amount of information, he/she can easily take notes of the lecture on his/her own. Thus, the student can take his/her time to think the lecture points over and to ask the teacher some questions in the lecture.

According to the above structure, the teacher needs not write down the contents of the lecture. Hence, the teacher can have the time to ask the students questions regarding the lecture and to have some communication with the students.

Accordingly, the teaching/learning-method facilitating system can facilitate such a class wherein the teacher and students can teach and learn comfortably.

After the lecture, the students can review the lecture using the recording medium 30 which has been detached from the information terminals 2.

For example, each student reproduces the information recorded in the third recording area 33 of the recording medium 30 together with the textbook information and lecture information, using a reproducing device having the same function as that of the information terminal 2. In doing so, the same circumstances as the lecture can be reproduced, and the students can effectively review the lecture.

The memo and underlines written by the student are recorded in the third recording area 33 of the recording medium 30. That is, those points which have been emphasized in the lecture by the student can be reproduced, and hence enhancing the learning efficiency.

In the above-described embodiment, the explanations have been made to the case wherein the multimedia board 1 sends the teacher-input information to each information terminal 2. However, each information terminal 2 may send the student-input information to the multimedia board 1. The information terminals 2 may send and receive the student-input information to and from each other.

In such conditions, the information terminals 2 can send student's questions to the multimedia board 1, and responses to the questions can be sent from the multimedia board 1 to the information terminals 2. The information terminals 2 can send and receive students' questions and answers to the questions to and from each other. The teacher can send some question or exam questions to the students, from the multimedia board 1 to the information terminals 2.

Such questions may be included in advance in the textbook information and lecture information recorded on the recording medium 30. In this case, each student operates the corresponding information terminal 2 to send answers to the questions to the multimedia board 1. The teacher operates the multimedia board 1 to receive answers to the sent questions from the students and send a result of the marking.

In the above-described embodiment, the handwritten information, such as the memo and underlines, is recorded in the third recording area 33 of the recording medium 30 automatically in association with the textbook information and lecture information. However, the handwritten information may be recorded in any other form under the control of the operator.

For example, the operational unit 53 of the information processor 17 includes a "recording-mode" button for controlling the recording of the information. In response to pressing of the "recording-mode" button by the operator, the information processor 17 may record the handwritten information on the recording medium 30. In addition, in response to second-time pressing of the "recording-mode" button, the information processor 17 may stop recording the handwritten information.

In the above-described embodiment, the explanations have been made to the case where the multimedia board 1 and information terminals 2 display the textbook information and lecture information side by side respectively in left and right windows. However, to easily see the displayed information, the multimedia board 1 and the information terminals 2 may display either the textbook information or lecture information, and display the other information upon request from the operator.

Any study guides related to the contents of the textbook may be recorded in the first recording area 31 or second recording area 32 of the recording medium 30. Then, the reader/writer 13 and 23 may read the study-guide information together with the textbook information from the recording medium 30, and the display unit 12 and 22 may display the read study-guide information in a different window from one displaying the textbook information.

The display unit 12 and 22 may display the textbook information, lecture information and study-guide information respectively in different three windows.

Second Embodiment

A teaching/learning-method facilitating system according to the second embodiment of the present invention will now be explained with reference to the accompanying drawings.

The teaching/learning-method facilitating system of this second embodiment is built, for example, in schools, and manages the attendance of students (listeners of lecture) for teachers (speaker of lecture).

Figure 9:
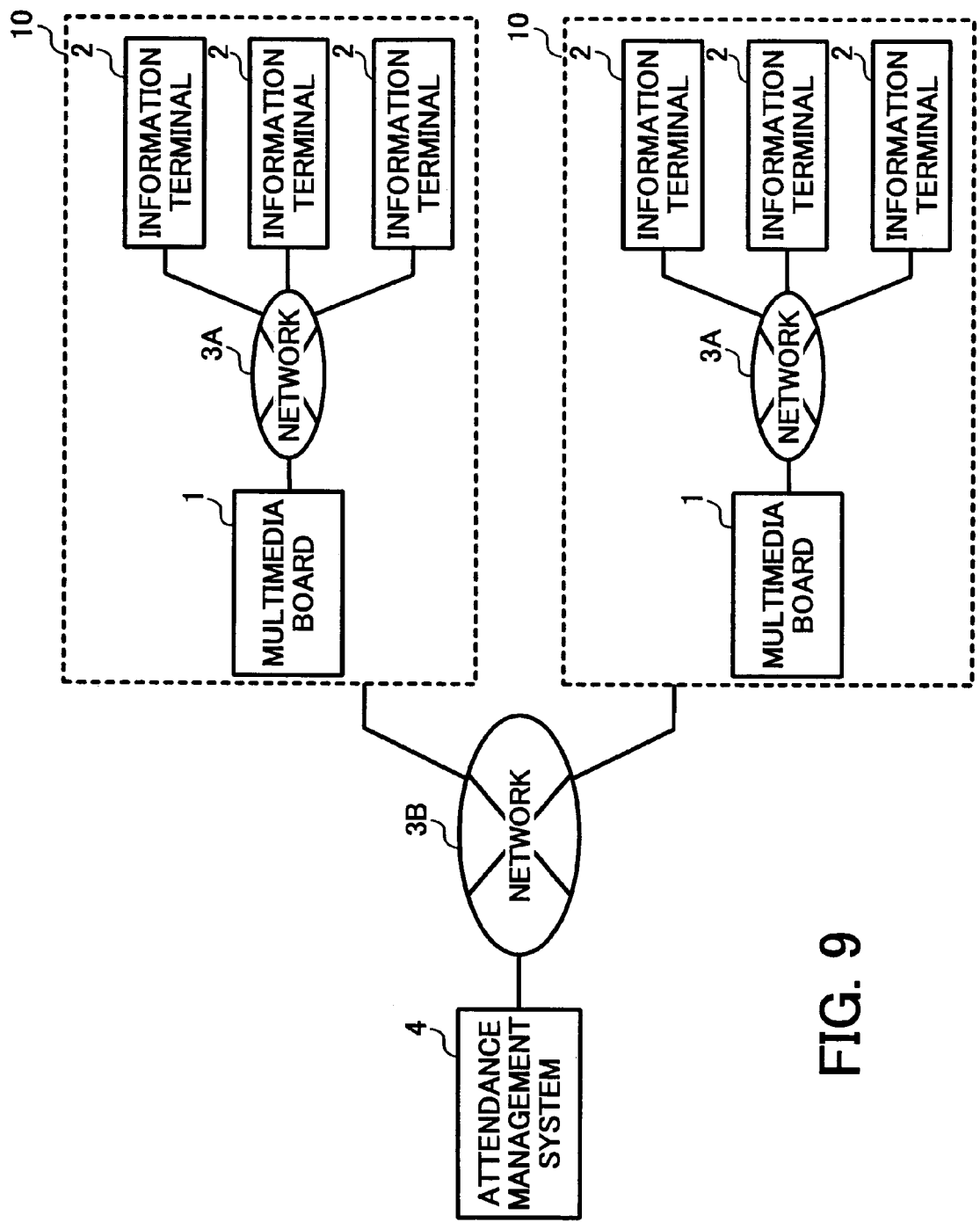
FIG. 9 is a diagram showing the structure of a teaching/learning-method facilitating system according to the second embodiment of the present invention.

As illustrated in FIG. 9, the teaching/learning-method facilitating system comprises an attendance management system 4, a plurality of in-class systems 10 and a network 3B. The attendance management system 4 and the plurality of in-school systems 10 are connected with each other through the network 3B.

The attendance management system 4 is installed in the administration office of school, and each in-class system 10 is installed in each classroom. The network 3B includes an in-class LAN, etc.

Each in-class system 10 has the same structure as that of the teaching/learning-method facilitating system described in the first embodiment of the present invention.

Specifically, each in-class system 10 comprises the multimedia board 1 and the plurality of information terminals 2 which are connected with each other through the network 3A. Note that each information terminal 2 not only has the functions described in the first embodiment, but also the following functions.

Each of the plurality of information terminals 2 has a device ID (identification information) for identifying the information terminal 2. The device ID is in one-to-one correspondence to the student number of a corresponding student who is to use the information terminal 2.

The memory 25 of the information terminal 2 stores attendance data, in association with the attendance of the student, student number and device ID.

Likewise the first embodiment, the controller 27 of the information terminal 2 receives position information representing the student-input letters and figures from the input section 21. Upon reception of the position information from the input section 21, the controller 27 acquires the attendance data and sends the acquired attendance data to the attendance management system 4 through the networks 3A and 3B.

The attendance management system 4 obtains the percentage of each student's attendance, based on the attendance data supplied from each information terminal 2, and stores information representing the obtained percentage in association with the supplied attendance data.

Figure 10:
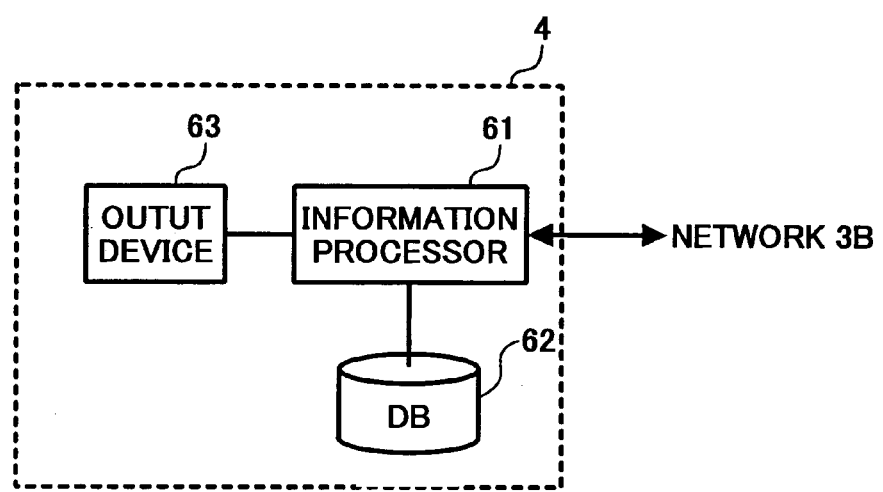
FIG. 10 is a block diagram showing the structure of an attendance management system.

FIG. 10 is a diagram showing the specific structure of the attendance management system 4.

As shown in FIG. 10, the attendance management system 4 comprises an information processor 61, a database 62 and an output device 63.

The information processor 61 receives the attendance data supplied from each information terminal 2 via the networks 3A and 3B. The information processor 61 stores the received attendance data in the database 62. The information processor 61 identifies each student by referring to the student numbers included in the attendance data stored in the database 62, and obtains the percentage of each student's attendance. The information processor 61 stores the obtained percentage of each student's attendance in the database 62, in association with the student numbers.

Upon reception of the attendance data, the information processor 61 generates confirmation information representing that the attendance of each student having the student number shown in the attendance data has been confirmed. After this, the information processor 61 sends the generated confirmation information to the information terminal 2 which is identified based on the device ID shown in the supplied attendance data.

As shown in FIG. 11, the database 62 stores and accumulates the attendance data supplied from each information terminal 2 and the percentage of each student's attendance obtained based on the attendance data.

The output device 63 includes a display and a printer, etc. In accordance with operations made by the operator, the output device 63 displays the attendance data, etc. stored in the database 62 or prints the attendance data.

Operations of the teaching/learning-method facilitating system according to the second embodiment of the present invention will now be explained.

As described in the first embodiment, in each classroom, the lecture is give using the in-class system 10. Each student takes memos of the lecture and underlines some important information based on the teacher's or his/her own determination, using a pen.

As explained above, the input section 21 of the information terminal 2 detects the positions that the student has touched on the touch panel 21A using a pen, and outputs the position information representing the detected positions to the controller 27.

Upon reception of the position information from the input section 21, the controller 27 acquires the attendance data from the memory 25 and sends the acquired attendance data to the attendance management system 4 through the networks 3A and 3B.

The information processor 61 of the attendance management system 4 receives the attendance data supplied from each information terminal 2 of each in-class system 10, and stores the received attendance data in the database 62. At this time, the information processor 61 generates confirmation information representing that the attendance of each student with the student number shown in the attendance data has been confirmed. Then, the information processor 61 sends the generated confirmation information to one information terminal 2 specified with a device ID shown in the received attendance data. Upon this, each student can check that that his/her attendance in the class has been registered in the database 62.

The information processor 61 acquires the attendance data accumulated in the database 62 at a predetermined time (e.g. at the end of each lecture). The information processor 61 obtains the percentage of each student's attendance based on the acquired attendance data, and stores the obtained percentage in the database 62 in association with the student number of each student.

The output device 63 displays the percentage of each student's attendance on a display page or prints out the percentage, in accordance with the operations of the operator.

According to the above structure, the attendance of each student is automatically registered in the attendance management system 4. Hence, it is not necessary that the teacher check the attendance of each student. In other words, the teacher can have a little longer period of time for giving a lecture, for the time for checking the attendance of the students in a class, and hence carrying out a comfortable class both for the teacher and students.

The information terminal 2 may display an attendance-check box on its display page, and send the attendance data to the attendance management system 4 in the case where the student marks (touches) the attendance-check box using the pen.

In this case, the information processor 61 of the attendance management system 4 sends attendance management data to the multimedia board 1 installed in each classroom wherein classes are to be held, in response to an operation of the operator. The attendance management data includes: both course information composed of dates and course names in association with each other; and display data of the attendance-check box.

The information processor 17 of the multimedia board 1 stores the attendance management data supplied from the attendance management system 4 in the memory 52. The information processor 17 sends the attendance management data stored in the memory 52 to each information terminal 2 within the same classroom, in response to an operation of the teacher.

The controller 27 of the information terminal 2 which has received the attendance management data controls the display section 22, and displays the attendance-check box together with the course information, based on the supplied attendance management data.

Those students who have attended the class input (touch) a check mark in the attendance-check box displayed by the display section 22, using the pen.

The input section 21 of the information terminal 2 detects whether the attendance-check box has been touched using the pen. The input section 21 outputs an attendance signal representing that the student has attended the class to the controller 27, in the case where it is detected that each student has touched the attendance-check box.

In response to the attendance signal from the input section 21, the controller 27 acquires the attendance data from the memory 25, and sends the acquired data to the attendance management system 4 through the networks 3A and 3B.

According to the above structure, the attendance management system 4 can register data about the attendance of each student in the database 62. Even in the case where the student has not taken memos or underlined any information during the class, the attendance of each student can be checked and managed.

According to the teaching/learning-method facilitating system according to the second embodiment, the teacher does not have to call student names or prepare an attendance list, to check the attendance of the students. In this manner, according to the teaching/learning-method facilitating system according to the second embodiment of the present invention, the teacher can save time, since he/she does not have to check the attendance of the students, and hence realizing a comfortable and easy class for the teacher and students.

According to the teaching/learning-method facilitating system according to the second embodiment of the present invention, some cheating, such that one student stays in a class as another student and answers to the teacher for the another student, can be prevented.

Third Embodiment

A teaching/learning-method facilitating system according to the third embodiment of the present invention will now be described with reference to the accompanying drawings.

The teaching/learning-method facilitating system according to the third embodiment is built, for example, in school, and manages evaluation of each student (listener of lecture) in each course.

Figure 12:
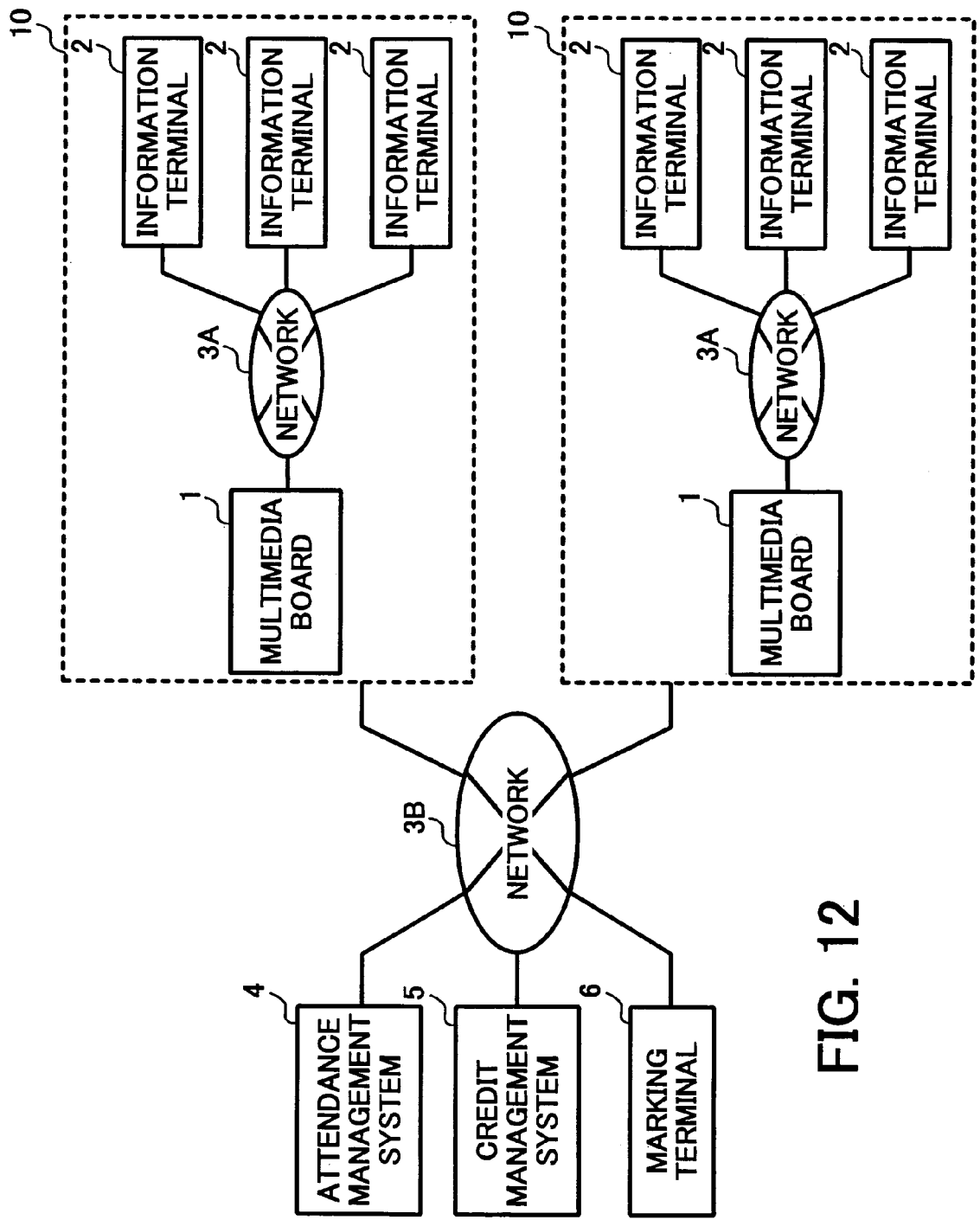
FIG. 12 is a diagram showing the structure of a teaching/learning-method facilitating system according to the third embodiment of the present invention.

The teaching/learning-method facilitating system includes a credit-management system 5 and a marking terminal 6, in addition to the structure of the teaching/learning-method facilitating system explained in the second embodiment, as illustrated in FIG. 12.

The exam of each source is taken using the in-class system 10 prepared in each classroom. Each student operates the information terminal 2 to answer each question included in the exam. The information terminal 2 records the answers of the student in the memory 25. In response to the operations of the student, the information terminal 2 outputs the answers recorded in the memory 25 to the marking terminal 6 through the networks 3A and 3B, together with the student number.

Figure 13A:
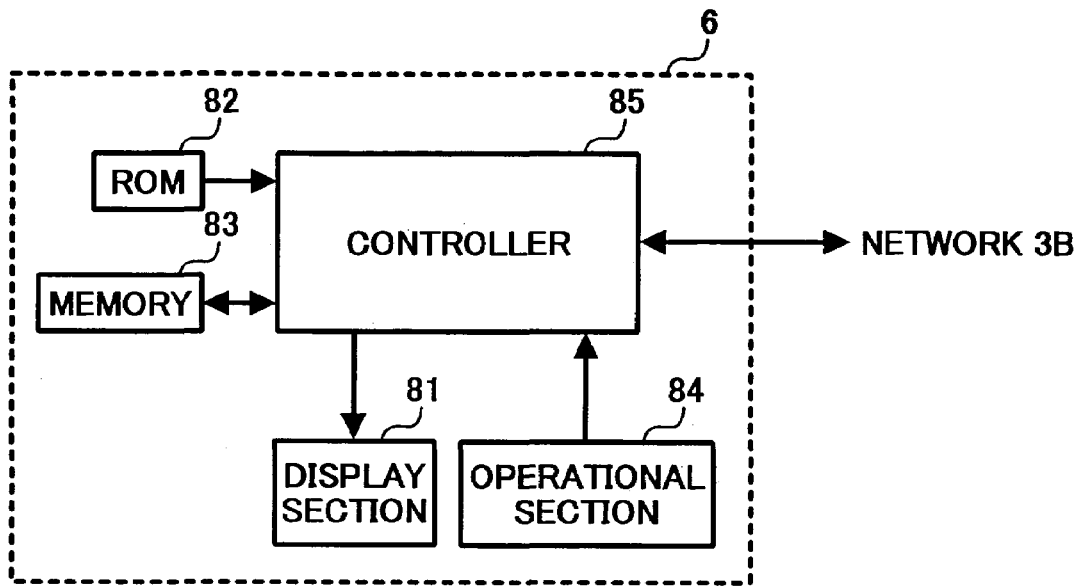
FIG. 13A is a block diagram showing the structure of a marking terminal.

The marking terminal 6 is installed in the administration office of the school, for example, and is used by teachers for marking answers of each students. As illustrated in FIG. 13A, the marking terminal 6 comprises a display section 81, a memory 82, a ROM 83, an operational section 84 and a controller 85.

The display section 81 displays answers of each student, etc., under the control of the controller 85.

The ROM 82 stores a program, etc. for controlling the operations of the controller 85.

The memory 83 serves as a work memory of the controller 85. The memory 83 stores the answers of each student which are provided from each information terminal 2 through the networks 3A and 3B. The memory 83 stores each student's mark of the exam.

The operational section 84 includes a plurality of operational buttons, and is operated by the teacher. The operational section 84 inputs an instruction signal for displaying the answers of each student to the controller 85, in response to an operation of the teacher.

The controller 85 includes a CPU, etc. for executing the program stored in the ROM 82.

The controller 85 receives the answers of each student which are supplied from the information terminal 2, and stores the received answers in the memory 83 in association with the student number of the student.

In response to an operation of the teacher, the controller 85 reads out the answers of each student from the memory 83, and displays the read answers on the display section 81.

The controller 85 records a result of the marking (mark of the exam) done by the teacher as marking data in the memory 83, in association with each student number, in response to an operation of the teacher.

In response to an operation of the teacher, the controller 85 acquires the marking data from the memory 83 and outputs the acquired data to the credit-management system 5 through the network 3B.

The credit-management system 5 is installed in the administration office of school, for example. The credit-management system 5 sees the correlation between the exam mark of each student and the attendance of the student which is stored in the attendance management system 4, and determines the grade of the student in the course.

Figure 13B:
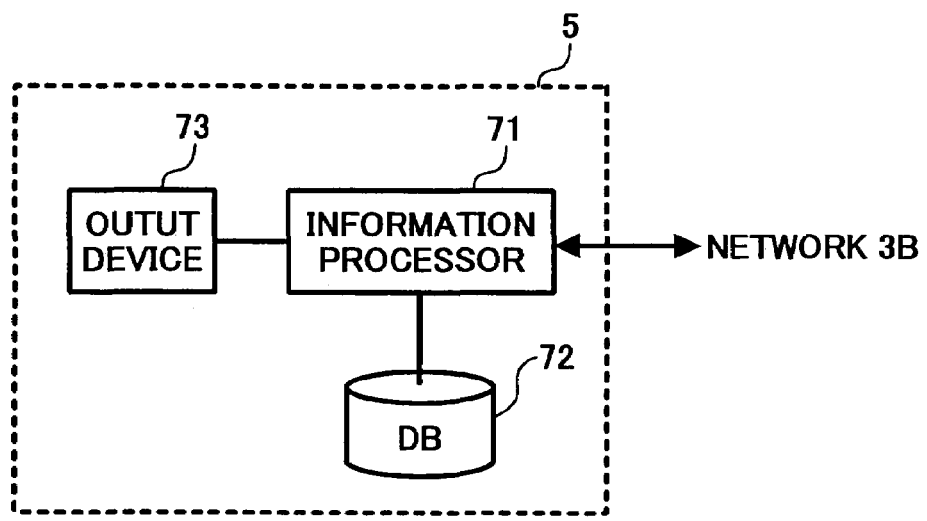
FIG. 13B is a block diagram showing the structure of a grade management system.

The credit-management system 5 comprises an information processor 71, a database 72 and an output device 73, as shown in FIG. 13B.

The information processor 71 receives the marking data representing the exam result of each student, from the marking terminal 6 through the network 3B. The information processor 71 stores the received marking data of each student in the database 72.

The information processor 71 accesses the attendance management system 4 through the network 3B, and acquires the percentage of each student's attendance corresponding to the student number, from the attendance management system 4. The information processor 71 stores the acquired percentage in the database 72 in association with the student number.

The information processor 71 determines whether each student has passed each course, in accordance with a preset method, using the marking data and percentage of the student's attendance which are stored in the database 72. The information processor 71 stores the determined results in the database 72 as course-passing information.

The database 72 stores: the student number of each student; percentage of each student's attendance; the marking data; and the course-passing information, in association with each other, under the control of the information processor 71, as illustrated in FIG. 14.

The output device 73 includes a display, a printer, etc. The output device 73 displays or prints "YES" or "NO" of whether the student has passed the course which is stored in the database 72, in response to an operation of the operator.

Other than the above, the structure of the teaching/learning-method facilitating system according to the third embodiment is the same as that described in the second embodiment.

Operations of the teaching/learning-method facilitating system according to the third embodiment of the present invention will now be explained.

(1) Exam

Explanations will now be made to the case wherein it is determined whether each student has passed a course, based on the mark of a final exam and the student's attendance in the course, by way of example.

Usually, the final exams are taken in the classrooms wherein the in-class system 10 is installed.

The teacher sets the recording medium 30 having the third recording area 33 in which the exam questions are recorded, into the reader/writer 13 of the multimedia board 1. On the other hand, each student sets the recording medium 30 having the third recording area 33 in which the exam questions are recorded, into the reader/writer 23 of each information terminal 2.

The information processor 17 of the multimedia board 1 controls the reader/writer 13 to read the exam questions from the recording medium 30, in response to an operation of the teacher. Then, the information processor 17 controls the display unit 12 to display the read exam questions.

At this time, the information processor 17 generates index information for specifying the exam questions to be displayed, and sends the generated index information to each information terminal 2 through the network 3A.

Upon reception of the index information supplied from the multimedia board 1, the controller 27 of each information terminal 2 controls the reader/writer 23 to read the exam questions specified by the index information from the recording medium 30. The controller 27 displays the read exam question on the display section 22.

Each student operates the input section 21 and operations section 26 of the information terminal 2 to input answers to the displayed questions. Then, until the completion time of the exam, each student operates the input section 21 and operational section 26 to send the input answers to the marking terminal 6 which is installed in a different place.

Specifically, the controller 27 of the information terminal 2 records the student-input answers in the memory 25. The controller 27 sends the answers stored in the memory 25 to the marking terminal 6 through the networks 3A and 3B, together with the student number, in response to an operation of the student.

The controller 85 of the marking terminal 6 receives the answers of each student from each information terminal 2, and stores the received answers in the memory 83 in association with the student number.

(2) "YES" or "NO" of Whether Student Passed Course

In response to an operation of the teacher, the controller 85 reads out the answers of each student from the memory 83 and displays the read answers on the display section 81.

The teacher operates an operational section 84 of the marking terminal 6 and marks the answers of each student.

The controller 85 records the marked result (exam result) in association with the student number in the memory 83 as marking data, in response to an operation of the teacher.

In response to an operation of the teacher, after the marking, the controller 85 acquires the marking data from the memory 83, and outputs the acquired data to the credit-management system 5 through the network 3B.

The information processor 71 of the credit-management system 5 receives the marking data of each student which is supplied from the marking terminal 6 through the network 3B, and stores the received data in the database 72.

The information processor 71 accesses the attendance-management system 4 through the network 3B, and acquires the percentage of each student's attendance from the attendance-management system 4. The information processor 71 stores the acquired percentage of each student's attendance in the database 72, in association with the student number of the student.

After this, the information processor 71 acquires the marking data of each student and the percentage of each student's attendance from the database 72, and determines whether each student has passed each course using a pre-determined method.

For example, the information processor 71 determines that a student has passed the course, in the case where the exam mark is equal to or higher than seventy and the percentage of student's attendance is equal to or higher than seventy percent.

The information processor 71 stores a result of the determination as to whether the student has passed the course, as the course-passing information in the database 72.

The information processor 71 acquires the determination result as to whether each corresponding student has passed the course, the mark of the exam and the percentage of the student's attendance, from the database 72, in accordance with operations of the operator (e.g. the teacher), and outputs the acquired information to the output device 73.

According to the teaching/learning-method facilitating system according to the third embodiment, the exams can be taken with ease and collection of the answers can easily be achieved. Based on the correlation between the percentage of the student's attendance and the exam's mark, the grade of each student can be evaluated.

In determining as to whether each student can move up to the next grade or can finish a high school or university, etc., objective and fair determination can be made. According to the system of this embodiment, the works necessary for determining whether each student has passed a course can be eliminated, so that the teachers can have a little longer time to directly concentrate on the education.

In the above-described embodiment, the explanations have been made to the case where the teacher operates the marking terminal 6 and marks students' exams. However, the marking terminal 6 itself may mark the exams.

In this case, the exams should be made in multiple-choice questions. Together with the exam questions, choices of each question are recorded in the third recording area 33 of the recording medium 30.

The controller 27 of each information terminal 2 controls the reader/writer 23, reads out the questions and their multiple choices from the recording medium 30, and displays the read information on the display section 22.

Each student selects one from the displayed multiple choices, using the pen.

The input section 21 outputs position information representing that the student has touched on the touch panel 21A using the pen, to the controller 27.

The controller 27 specifies the selected answer based on the position information supplied from the input section 21, and records the specified answer in the memory 25.

The controller 27 sends the answers stored in the memory 25 to the marking terminal 6 through the networks 3A and 3B, together with the student number, in response to an operation of the student.

The memory 83 of the marking terminal 6 stores the correct answers of the exam questions in advance.

The controller 85 of the marking terminal 6 records the answers of each student which are sent from each information terminal 2 in the memory 83, in association with the student number.

In response to an operation of the operator (e.g. the teacher), the controller 85 acquires the correct answers of the exam questions and the answers of each student from the memory 83, so as to mark the exams. The controller 85 records the marked result as marking data in the memory 83, in association with the student number of each student.

In this way, more objective and fair determination as to whether each student has passed a course can be made, than the case of the second embodiment. In addition, the teacher can have a little longer time for concentrating on the education, rather than going through all the troublesome tasks.

In the above embodiments, the credit management system 5 determines whether each student has passed a course based on the mark of the final exam and the percentage of his/her attendance. In addition to that, the determination may be made based also on in-class tests, reports, papers, participation, etc.

The credit-management system 5 may send data representing the determination result of whether each student has passed a course, to an information terminal 2 specified by the device ID.

The information processor 71 of the credit-management system 5 may obtain statistics information including, for example, the highest mark, lowest mark, average mark, etc., based on the marking data. Further, the information processor 71 may set the lowest passing mark as a reference mark, based on which determination as to whether each student has passed a course is made, based on the obtained statistics information.

In the above-described embodiments, the explanations have been made to the case where the credit-management system 5 receive the marking data through the networks 3B. However, the marking data may directly be input by the operator.

In any one of the above-described first to third embodiments, the Internet, etc. may be employed, in place of the networks 3A and 3B including the LAN.

In the above embodiments, the information terminals 2 are fixed and installed in the classroom, etc. However, the students may carry the information terminals 2 together with the information recording medium 30, and may use the information terminals 2 not only during the class, but also after they get home.

The system of the present invention can be realized by a general computer, without the need for a dedicated system. A program and data for controlling a computer to execute the above-described operations may be recorded on a medium (a floppy disk, CD-ROM, DVD or the like) and distributed, and the program may be installed into the computer and run on an OS (Operating System) to execute the above-described operations, thereby achieving the system of the present invention. The above program and data may be stored in a disk device or the like in the server device on the Internet, and embedded in a carrier wave. The program and data embedded in the carrier wave may be downloaded into the computer so as to realize the system of the present invention.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application Nos. 2001-027465 and 2001-027466 both filed on Feb. 2, 2001, and including specification, claims, drawings and summary. The disclosure of the above Japanese Patent Application is incorporated herein by reference in its entirety.

What is claimed is:

1. A system, comprising:
   a lecture terminal and a plurality of listener terminals,
   the lecture terminal comprising:
   a first input unit, the first input unit comprising a touch panel for inputting information written by a lecturer on the touch panel by detecting positions at which the lecturer touches the touch panel, obtaining coordinates of the detected positions and outputting coordinate information corresponding to the detected positions,
   a written-information sender configured to identify the lecture-written information and send the identified lecture-written information to the listener terminals, and at least one of the listener terminals comprising:

a first reader configured to read, from a listener recording medium, book information representing information from a book, a first display configured to display, on a listener page, the book information and the lecture-written information from the written-information sender, a first writer configured to record, on the listener recording medium, the lecture-written information displayed by the first display;

an attendance-management terminal configured to manage listener attendance, at least one of the listener terminals comprising:

an attendance-information sender configured to send attendance information representing listener attendance at a lecture to the attendance-management terminal in response to a listener touching a touch panel located on the listener page, the attendance-management terminal being configured to use the attendance information to obtain a percentage of lectures attended by a listener, a credit-management terminal configured to determine whether a listener has passed a course, the credit-management terminal comprising:

a database configured to store a listener's exam result, an acquirer configured to acquire from the attendance-management terminal the percentage of the listener's attendance, a credit determiner configured to determine, based on the listener's exam result and the percentage of the listener's attendance, whether the listener has passed a course, a marking terminal configured to mark a listener's answer to a multiple-choice exam question, at least one of the listener terminals comprising:

an answer acquirer configured to acquire an answer written by a listener on a listener page, and an answer sender configured to send the acquired answer to the marking terminal, the marking terminal comprising:

a memory configured to store correct answers, and a marker configured to mark the acquired answer using the correct answers stored in the memory, and a result sender configured to send a marked result of the marker to the credit-management terminal as the exam result of the listener.

2. The system of claim 1, wherein:

the listener terminal displays a symbol on the listener page indicating confirmation of attendance at a lecture by a listener, the listener terminal comprises a detector configured to detect that a listener has touched a position on the touch panel corresponding to the position of the displayed symbol and, upon detection that the listener has touched the listener page, the attendance-information sender sends the attendance information to the attendance-management terminal.

3. The system of claim 1, comprising:

a marking terminal configured to mark a listener's answer to an essay exam question, at least one of the listener terminals comprising:

an answer acquirer configured for acquiring an answer written by a listener on a touch panel on a listener page, and an answer sender configured to send the acquired answer to the marking terminal, the marking terminal comprising:

a memory configured to store an answer provided by the answer sender and marking results carried out by the lecture, and a display configured to present the answer of the plurality of listeners to the lecture by displaying the answers of the plurality of listeners stored in the memory and the memory stores marking results carried out by the lecture.

* * * * *